(12) United States Patent
Gross et al.

(10) Patent No.: US 6,553,390 B1
(45) Date of Patent: Apr. 22, 2003

(54) METHOD AND APPARATUS FOR SIMULTANEOUS ONLINE ACCESS OF VOLUME-MANAGED DATA STORAGE

(75) Inventors: Danny Brice Gross, Austin, TX (US); Michael Douglas O'Donnell, Austin, TX (US); Brian L. Borgeson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 33 days.

(21) Appl. No.: 09/712,646

(22) Filed: Nov. 14, 2000

(51) Int. Cl.[7] .............. G06F 12/00; G06F 9/00; G06F 17/50
(52) U.S. Cl. .............. 707/202; 713/100; 716/1
(58) Field of Search .............. 711/111, 112, 113, 711/114; 713/1, 2, 100; 716/1, 4, 5, 6, 7; 707/202

(56) References Cited

U.S. PATENT DOCUMENTS

| | | | | |
|---|---|---|---|---|
| 5,917,998 A | * | 6/1999 | Cabrera et al. | 711/114 |
| 5,983,316 A | * | 11/1999 | Norwood | 711/112 |
| 6,009,252 A | * | 12/1999 | Lipton | 716/1 |
| 6,128,734 A | * | 10/2000 | Gross et al. | 713/100 |
| 6,269,381 B1 | * | 7/2001 | St. Pierre et al. | 707/202 |
| 6,286,126 B1 | * | 9/2001 | Raghavan et al. | 716/6 |
| 6,304,999 B1 | * | 10/2001 | Toprac et al. | 716/4 |
| 6,341,333 B1 | * | 1/2002 | Schreiber et al. | 711/114 |

* cited by examiner

Primary Examiner—Trong Phan
(74) Attorney, Agent, or Firm—Williams, Morgan & Amerson, P.C.

(57) ABSTRACT

The present invention provides for a method and an apparatus for simultaneous online access of volume-managed data storage. A portion of a storage media to be mirrored is identified. An independent disk-mirror split-off process on the identified portion of the storage media to be mirrored is performed to produce a data mirror that is capable of being independently accessed.

30 Claims, 7 Drawing Sheets

METHOD AND APPARATUS FOR SIMULTANEOUS ONLINE ACCESS OF VOLUME-MANAGED DATA STORAGE

BACKGROUND OF THE INVENTION

1. FIELD OF THE INVENTION

This invention relates generally to database management, and, more particularly, to a method and apparatus for simultaneously accessing identical volume-managed disks or disk groups.

2. DESCRIPTION OF THE RELATED ART

Modern developments in manufacturing processes have brought forth the need for complex and innovative methods of tracking and documenting the many steps involved in such processes. Today's manufacturing processes, particularly semiconductor manufacturing processes, call for a large number of important steps. Because of the importance of these process steps, a large number of data files are generated to properly document their processes and their completion.

The manufacture of semiconductor devices requires a number of discrete process steps to create a packaged semiconductor circuit device from raw semiconductor material. The various processes, from the initial manufacture of the semiconductor material, the slicing of the semiconductor crystal into individual wafers, the fabrication stages (etching, doping, ion implanting, or the like), to the packaging and final testing of the completed device, are so different from one another and specialized that the processes may be performed in different facilities in remote regions of the globe. These steps result in a large amount of data that must be tracked, stored, backed up, and accessed properly.

Computer systems manage large amounts of data that result from manufacturing processes, particularly manufacturing of semiconductor devices. Many data files resulting from manufacturing processes are created and analyzed. The data files can be used to monitor the performance of the manufacturing processes and make appropriate changes. Furthermore, the data files that are created during the manufacturing processes must be stored and accessed for later analysis. Interrupting a real-time process, such as a manufacturing process, in order to access and manipulate databases can be inefficient and costly.

The state-of-the-art lacks an efficient means of accessing a real-time database in a safe manner. Generally, accessing a database that is related to a manufacturing process can cause file corruption, particularly during real-time access. File corruption in a manufacturing database can cause an associated manufacturing production line to become inefficient or inoperable, resulting in large losses. Accessing a real-time manufacturing database may require a temporary shutdown of a production line, which can result in intolerable loss of revenue. Furthermore, accessing a real-time manufacturing database, without significant risks of corrupting the database, is desirable for development and testing of various products.

The present invention is directed to overcoming, or at least reducing the effects of, one or more of the problems set forth above.

SUMMARY OF THE INVENTION

In one aspect of the present invention, a method is provided for simultaneous online access of volume-managed data storage. A portion of a storage media to be mirrored is identified. An independent disk-mirror split-off process on the identified portion of the storage media to be mirrored is performed to produce a data mirror that is capable of being independently accessed.

In another aspect of the present invention, an apparatus is provided for simultaneous online access of volume-managed data storage. The apparatus of the present invention comprises: a computer system; at least one manufacturing tool coupled with the computer system, wherein the manufacturing tool is controlled by the computer system; a storage media coupled with the manufacturing tool, the storage media being capable of storing data from the manufacturing tool and generating a plurality of data mirrors of stored data; and a volume manager coupled with the storage media and the computer system, the volume manager being capable of controlling the storage media and independently accessing at least one data mirror within the storage media.

BRIEF DESCRIPTION OF THE DRAWINGS

The invention may be understood by reference to the following description taken in conjunction with the accompanying drawings, in which like reference numerals identify like elements, and in which.

Appendix A illustrates software code used to store the name of the data mirror.

Appendix B illustrates software code used to create a data mirror of a portion of the storage media that is identified to be mirrored; and Appendix C illustrates a software code used to filter and organize the data mirror and manipulate an extracted data file.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Storing, archiving, and retrieving data is very important in the area of high-technology manufacturing, particularly in the area of semiconductor manufacturing. Scores of data files from many steps in the processes of semiconductor manufacturing are stored and archived for later retrieval or for real-time use. The present invention provides a method and an apparatus for storing and accessing manufacturing data based upon a substantially real-time basis. The present invention further provides a method and apparatus for creating and accessing an independent mirror image of a database storage medium, such as a database storage disk.

Figure 1:
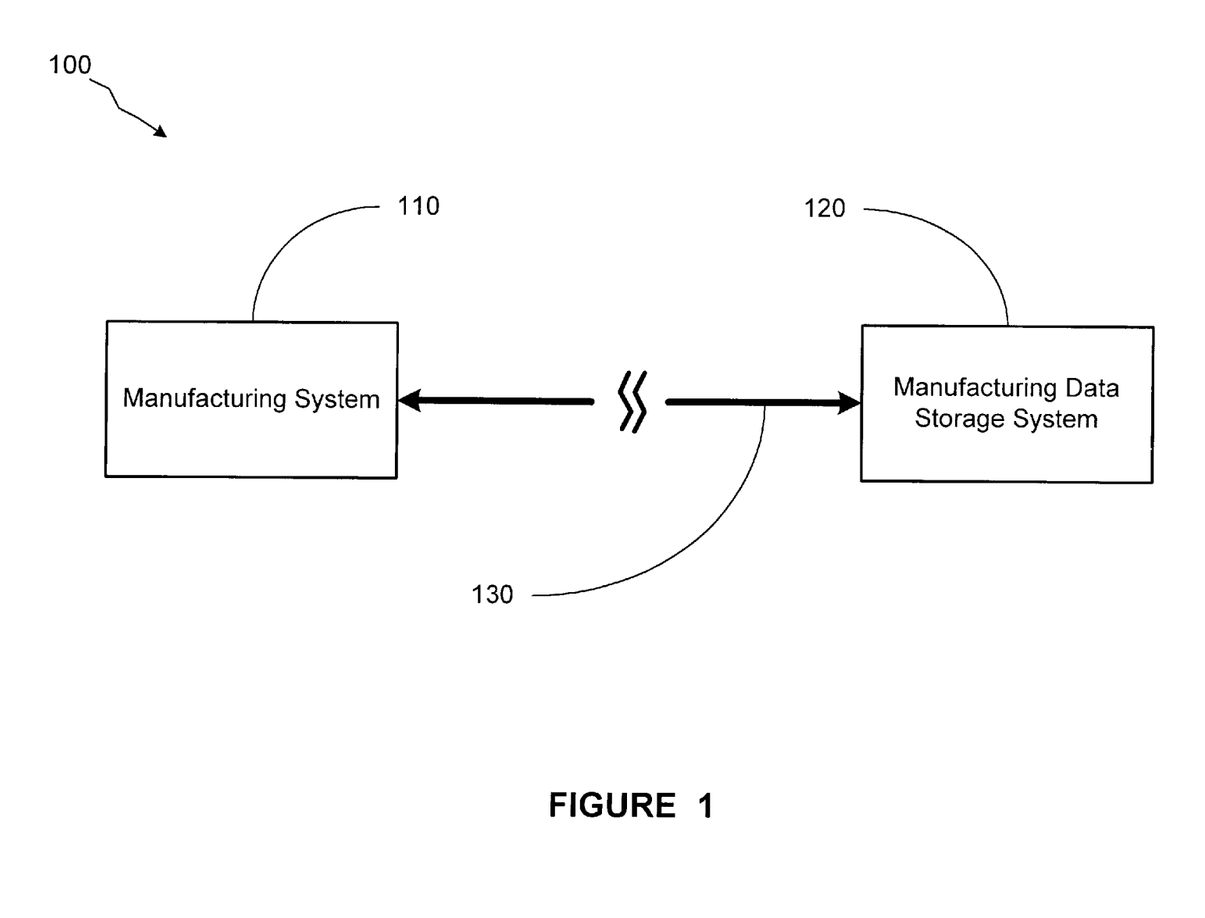
FIG. 1 illustrates one embodiment of the present invention.

Turning now to FIG. 1, one embodiment of an apparatus 100 in accordance with the present invention is illustrated. A manufacturing system 110 is coupled with a manufacturing data storage system 120. In one embodiment, the manufacturing system 110 is a semiconductor manufacturing system that comprises equipment that is capable of processing semiconductor wafers and a control system that can automatically control the processing equipment. The manufacturing data storage system 120 is capable of storing and providing access to a plurality of manufacturing databases. The manufacturing data storage system 120 utilizes data storage mediums, such as data storage disks, that can store and provide access to a plurality of manufacturing databases. An interface line 130 is used to couple the manufacturing system 110 with the manufacturing data storage system 120. In one embodiment the interface line 130 comprises a computer network connection line.

Figure 2:
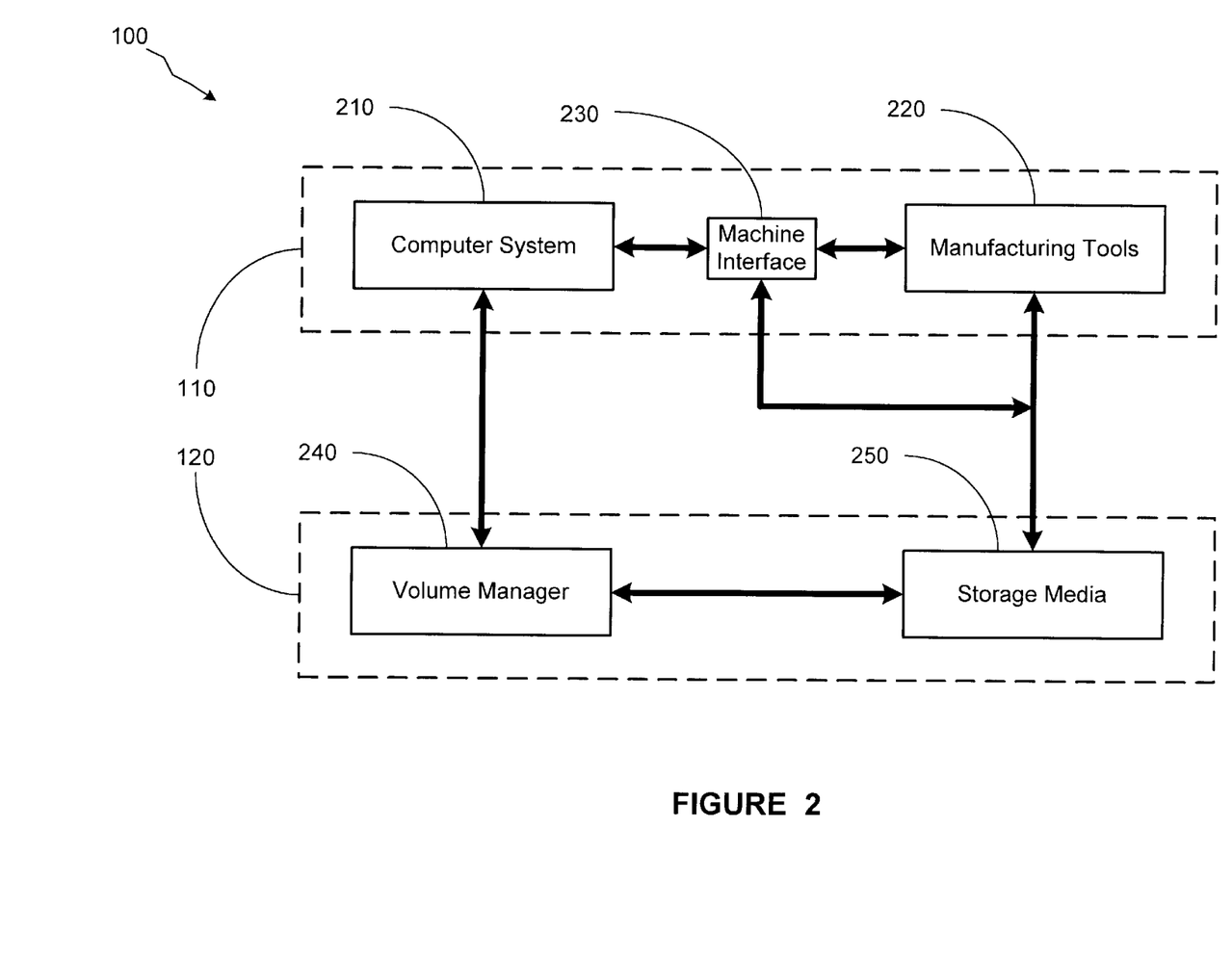
FIG. 2 illustrates a more detailed depiction of the apparatus in accordance with the present invention.

Turning now to FIG. 2, a more detailed depiction of one embodiment of the apparatus 100 described in FIG. 1 is illustrated. In one embodiment, the manufacturing system 110 comprises a computer system 210 and at least one manufacturing tool 220, and at least one machine interface 230. In one embodiment, the computer system 210 is capable of controlling the manufacturing tools 220. In one embodiment, the computer system 210 may be comprised of a Macintosh system, a UNIX system, a PC system, a VAX system, a Workstation system, or any other system employed by those skilled in the art. In one embodiment, the computer system 210 is capable of performing automated process control of the manufacturing tools 220. The computer system 210 is further capable of directing data flow to and from the manufacturing tools 220. In one embodiment, data flow between the computer system 210 and the manufacturing tools 220 is facilitated by the machine interface 230. The machine interface 230 is capable of receiving control signals from the computer system 210 and executing control of the manufacturing tools 220 in response to the control signals. The machine interface 230 is further capable of providing data, such as status data, from the manufacturing tools 220 to the computer system 210.

In one embodiment, the manufacturing data storage system 120 comprises a volume manager 240 and a storage media 250. In one embodiment, the storage media 250 is interfaced with the machine interface 230, the manufacturing tools 220, and the volume manager 240. The volume manager 240 is interfaced with the computer system 210 and the storage media 250. In one embodiment, the storage media 250 comprises an array of data storage devices, such as magnetic storage hard disks. In an alternative embodiment, the storage media 250 comprises one or a plurality of storage devices, such as CD-ROMs or other data storage devices known by those skilled in the art. In one embodiment, the storage media 250 comprises an array of disks supplied under the trade name EMC®.

The volume manager 240 is capable of controlling data storage in to the storage media 250. In one embodiment, the volume manager 240 comprises a computer software program that is capable of controlling data flow in and out of the storage media 250. In one embodiment, in order to implement the principles taught by the present invention, the Veritas Volume Manager® can be used as the volume manager 240. In one embodiment, the volume manager 240 is capable of controlling multiple groupings of disks in the storage media.

Figure 3:
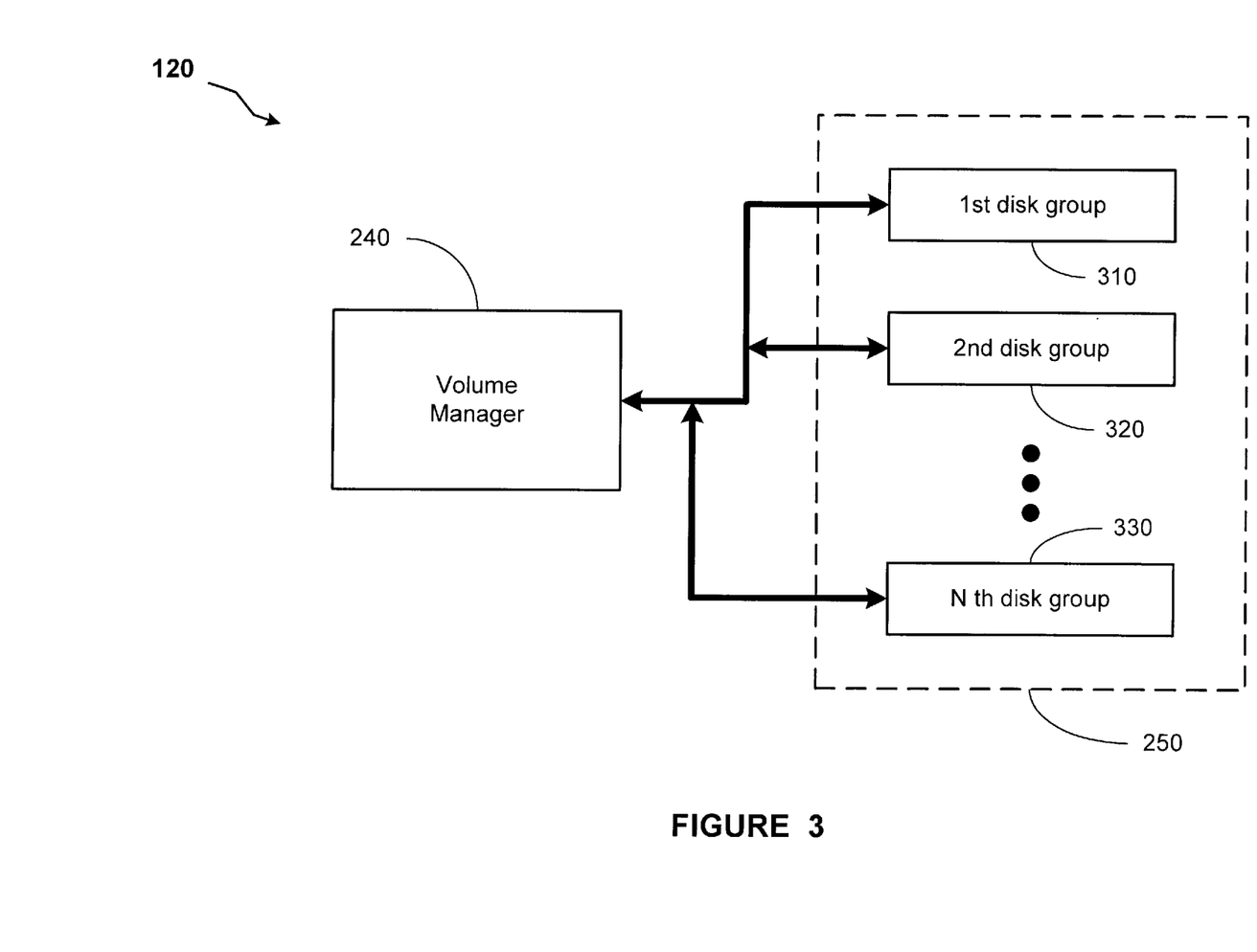
FIG. 3 illustrates a more detailed depiction of the manufacturing data storage system in accordance with the present invention.

Turning now to FIG. 3, a more detailed depiction of the interfacing between the volume manager 240 and the storage media 250 is illustrated. In one embodiment, the storage media 250 comprises a first disk group 310, a second disk group 320, and an Nth disk group 330. In one embodiment, each disk group 310, 320, 330 is comprised of a set of storage capacity, such as a group of individual disk drives. In an alternative embodiment, the first through Nth disk groups 310, 320, 330 can be organized within an individual disk drive in the storage media 250. The first through Nth disk groups 310, 320, 330 can be comprised of data storage spaces that are of different sizes.

As illustrated in FIG. 3, the volume manager 240 is capable of controlling each of the first through Nth disk groups 310, 320, 330 individually. In other words, data retrieval and storage within each of the first through Nth disk groups 310, 320, 330 can be controlled by the volume manager 240 on an individual disk group basis. The volume manager 240 controls data flow between the manufacturing system 110 and the first through Nth disk groups 310, 320, 330 in the storage media 250.

Figure 4:
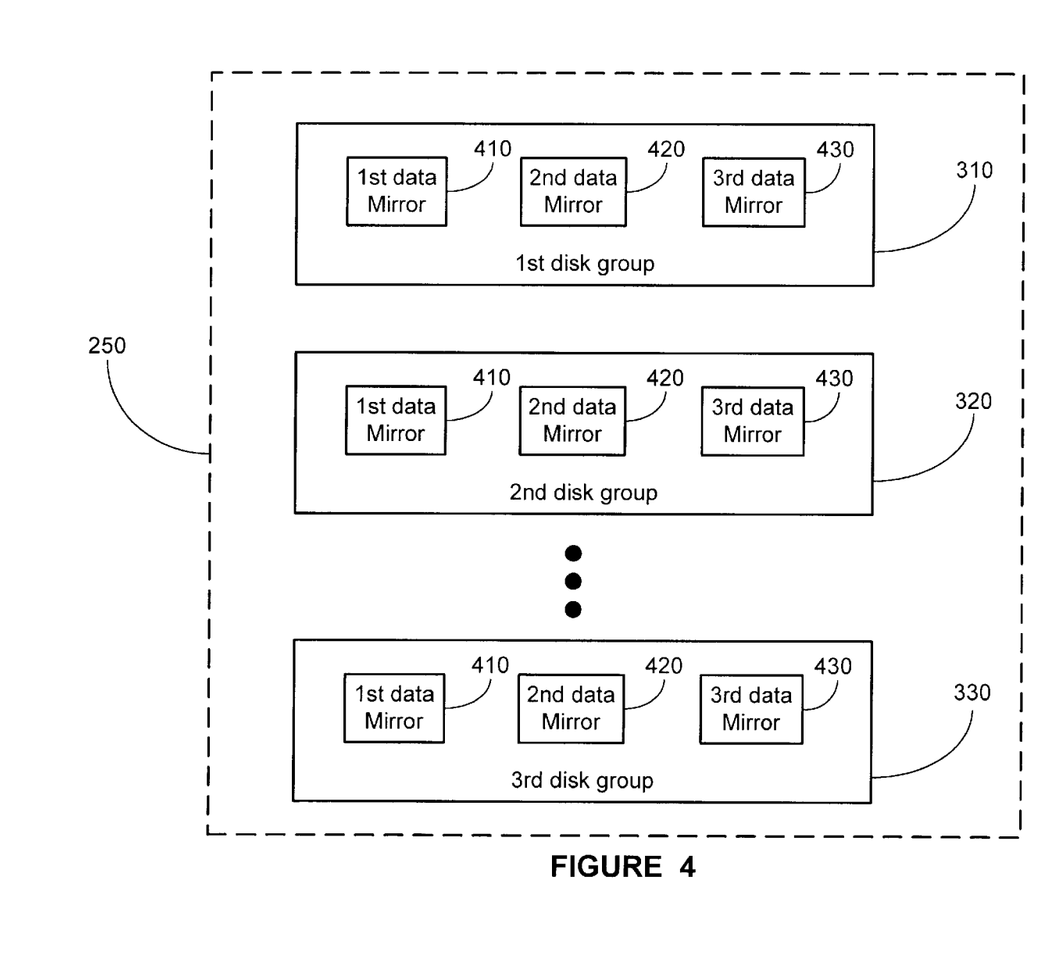
FIG. 4 illustrates a more detailed depiction of the storage media illustrated in FIGS. 2 and 3.

Turning now to FIG. 4, a more detailed depiction of the first through Nth disk groups 310, 320, 330 in the storage media 250 is illustrated. In one embodiment, each of the first through Nth disk groups 310, 320, 330 comprises a subset of identical data storage portions called disk mirrors. As illustrated in FIG. 4, each of the first through Nth disk groups 310, 320, 330 comprises a first data mirror 410, a second data mirror 420, and a third data mirror 430. In one embodiment, the data mirrors 410, 420, 430 are duplicates of a portion of the first through Nth disk groups 310, 320, 330. In one embodiment, each of the data mirrors 410, 420, 430 within a disk group 310, 320, 330 is a bit-by-bit replication of the other. In one embodiment, the data mirrors 410, 420, 430 within the first through Nth disk groups 310, 320, 330 are created using a registered product known as Time Finder®. In one embodiment, the data mirrors 410, 420, 430 are identical databases.

The volume manager 240 is interfaced with each of the first through Nth disk groups 310, 320, 330 such that the volume manager 240 is capable of creating and manipulating the data mirrors 410, 420, 430 within the first through Nth disk groups 310, 320, 330. In one embodiment, the volume manager 240 generates additional data mirrors 410, 420, 430 within a disk group 310, 320, 330 using Time Finder®. Responding to commands from the computer system 210, the volume manager 240 stores data from the manufacturing system 110 into the storage media 250. The volume manager 240 is capable of organizing the storage media 250 into the first through Nth disk groups 310, 320, 330 and storing data from the manufacturing system 110 into the first through Nth disk groups 310, 320, 330. The volume manager 240 is further capable of generating data mirrors 410, 420, 430 of the database that contains data from the manufacturing system 110.

Figure 5:
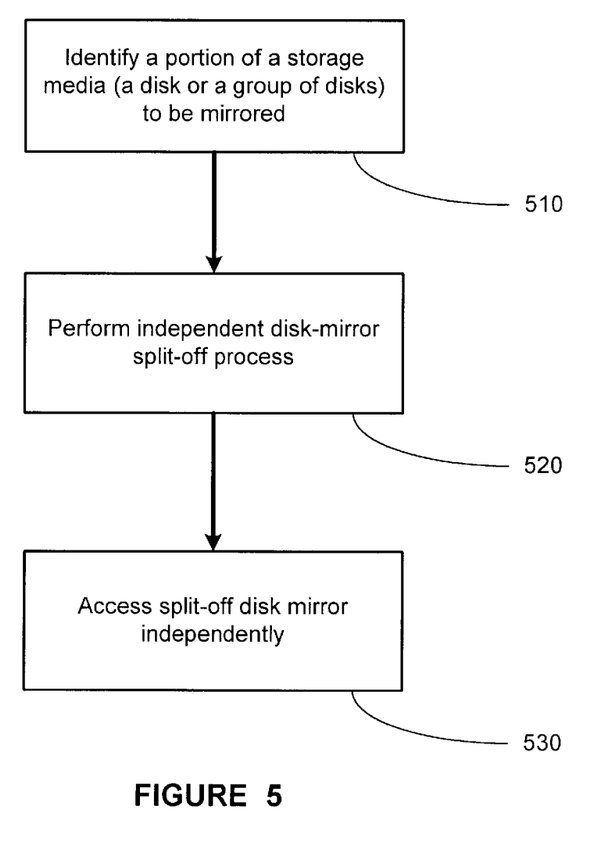
FIG. 5 illustrates a flowchart depiction of one embodiment of the method in accordance with the present invention.
Figure 6:
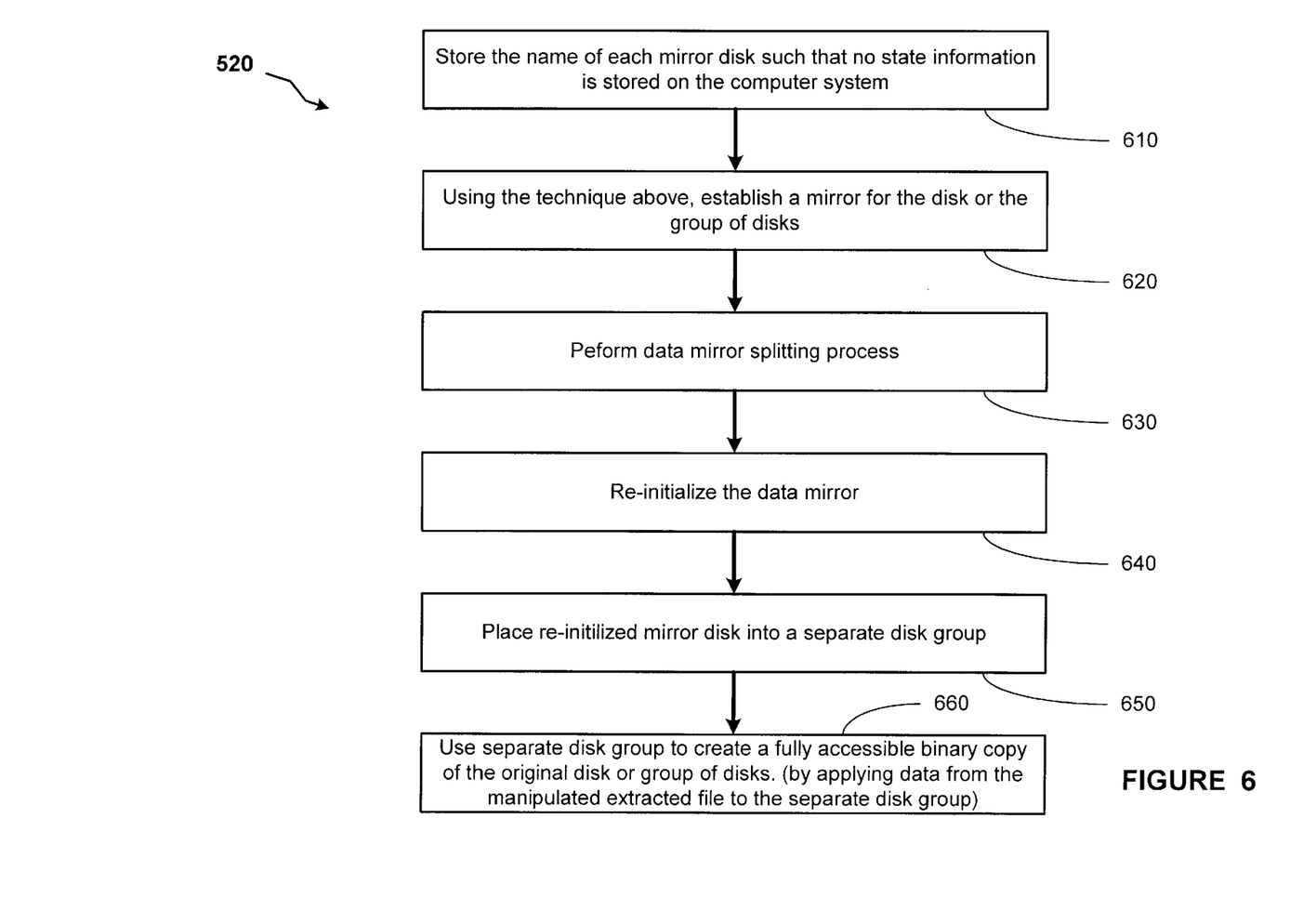
FIG. 6 illustrates a more detailed flowchart depiction of one embodiment of the step of performing an independent disk-mirror split-off process described in FIG. 5.

Turning now to FIG. 5, a flowchart depiction of the methods in accordance with the present invention is illustrated. A portion of the storage media 250, such as a data storage disk or a portion of a data storage disk, is identified to be mirrored or duplicated, as described in block 510 of FIG. 5. In one embodiment, the computer system 210 in the manufacturing system 110 is used to determine which portion of the storage media 250 is to be mirrored. Once the portion of the storage media 250 is identified, an independent disk-mirror split-off process is performed. FIG. 6 illustrates a more detailed depiction of the steps for implementing an independent disk-mirror split-off process.

Turning now to FIG. 6, once a portion of the storage media 250 is identified for mirroring, the name of the portion (the data mirror 410, 420, 430) is stored in such a manner that no state information is stored into the computer system 210, as described in block 610 of FIG. 6. In one embodiment, the name of the data mirror 410, 420, 430 is stored in the comment field of the Veritas® configuration copy for each source disk. In one embodiment, the step of storing the name of the data mirror 410, 420, 430 is performed using the Veritas® software code illustrated in Appendix A. Since the state information of the mirror disk is not stored in the computer system 210, the first through Nth disk groups 310, 320, 330 may be activated, de-activated, or deported to another system without losing its mirroring information.

Figure 7:
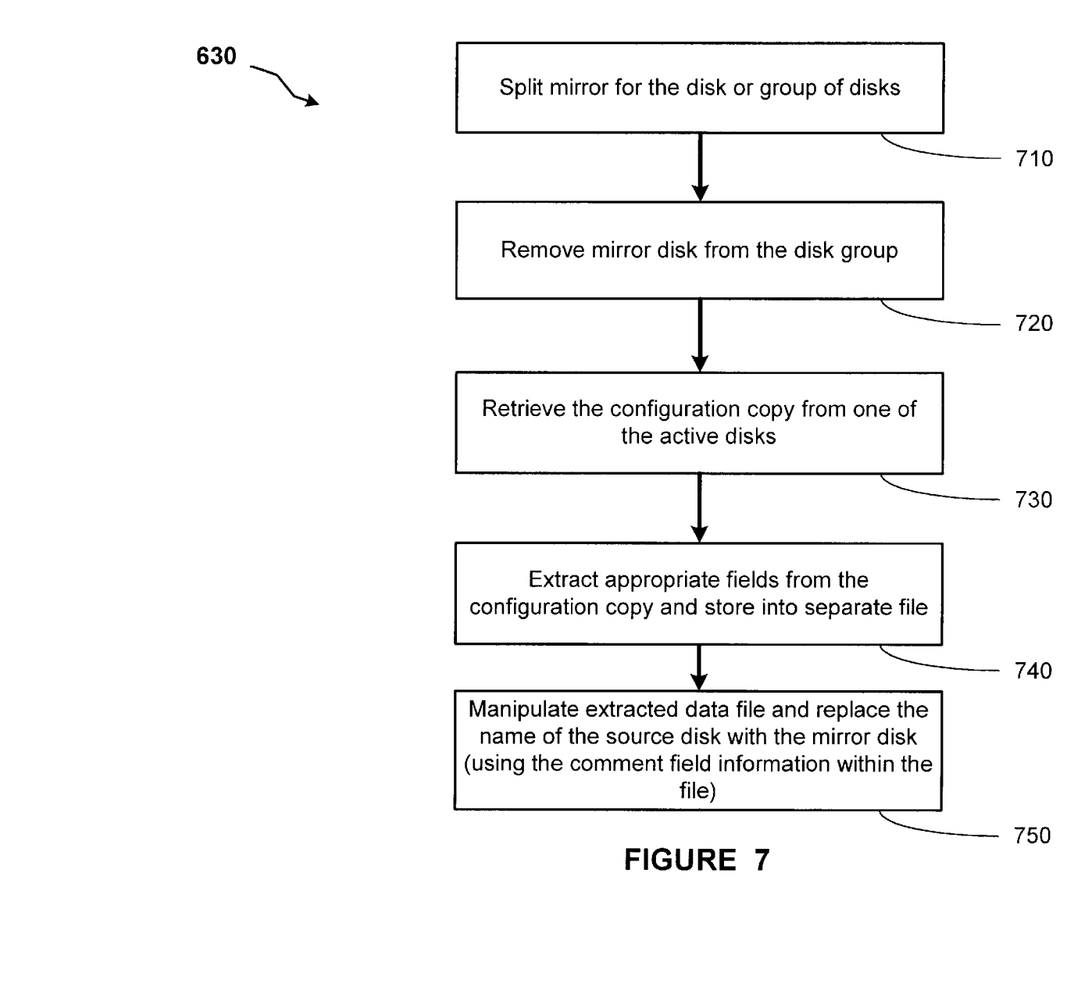
FIG. 7 illustrates a more detailed flowchart depiction of one embodiment of the step of performing the mirror splitting process described in FIG. 6.

Using the methods described above, a data mirror 410 is established for the identified portion of the storage media 250 identified for mirroring, as described in block 620 of FIG. 6. In one embodiment, the volume manager 240 uses Time Finder® to create a data mirror of the portion of the disk group 310, 320, 330 in the storage media 250 identified for mirroring. In one embodiment, the Veritas® software code illustrated in Appendix B is used to create a data mirror 410 of a portion of the storage media 250. Once a data mirror 410 is created, a data mirror splitting process is performed, as described in block 630 of FIG. 6. FIG. 7 illustrates a more detailed depiction of the steps for implementing the data mirror splitting process described in block 630 of FIG. 6.

Turning now to FIG. 7, the data mirror 410 is split-off from the disk group 310 in the storage media, as described in block 710 of FIG. 7. The data mirror 410 is then removed from the disk group 310, as described in block 720 of FIG. 7. In one embodiment, the first data mirror 410 is removed from the first disk group 310, which still contains the second data mirror 420 and the third data mirror 430. The second and third data mirrors 420, 430 are still active in the first disk group 310. Once a data mirror 410 is removed from the disk group 310, a configuration copy from one of the active data mirrors (i.e., the second and third data mirrors 420, 430) is retrieved, as described in block 730 of FIG. 7. In one embodiment, the Veritas® command "vxdg list <disk group name>|grep -I config" is used to locate a disk from the disk group with a configuration copy. In one embodiment, the extraction of the configuration copy from one of the active data mirrors 420, 430 is performed using the Veritas® command "vxprivutil."

Once a configuration copy from one of the active data mirrors 420, 430 is found, the appropriate fields from the configuration copy are extracted and copied onto a separate file or disk, as described in block 740 of FIG. 7. The extracted data file that contains the fields from the configuration copy is then manipulated to replace the name of the source disk with the mirror disk, as described in block 750 of FIG. 7. In one embodiment, the data file that contains the fields from the configuration copy is manipulated using the comment field information within the file. In one embodiment, the extracted data file is manipulated using the Veritas® software code illustrated in Appendix C. The completion of the steps described in FIG. 7 substantially completes the data mirror splitting process described in block 630 of FIG. 6.

Turning back to FIG. 6, once the data mirror splitting process is substantially complete, the inactive data mirror 410 is re-initialized, as described in block 640 of FIG. 6. Once the data mirror 410 is re-initialized, the re-initialized data mirror 410 is placed into a separate disk group 320, as described in block 650 of FIG. 6. In one embodiment, the Veritas® command "vxmake -g <new disk group>-d <group name>.desc" is used to place the re-initialized data mirror 410 into a new disk group 320. The information from the manipulated extracted data file is applied to the separate disk group 320, and access to the data mirror 410 is activated. This results in a binary copy of the original data mirror 410 from the original disk group 310, which is now accessed from a new separate disk group 320, as described in block 660 of FIG. 6. In other words, the data mirror 410 is now a fully accessible copy of the inactive data mirrors 420, 430. The completion of the steps described in FIG. 6 substantially completes the process of performing an independent disk-mirror split-off process described in block 520 of FIG. 5.

Turning back to FIG. 5, once the disk-mirror split-off process is substantially completed, the split-off data mirror 410 is independently accessed, as described in block 530 of FIG. 5. In other words, the split-off data mirror 410, which is a substantially real-time copy of the inactive disk mirrors 420, 430, can now be accessed independently without disturbing the inactive disk mirrors 420, 430 or the original disk group 310.

There are many advantages that result from being able to access an independent data mirror 410, which is a database, without disturbing the original database or other data mirrors 420, 430 corresponding to the original database. An independent data mirror 410 that contains manufacturing data can be accessed and analyzed without disturbing the manufacturing process itself. By analyzing the independent data mirror 410, feedback modifications can be made to the manufacturing process in a virtually real-time basis. Furthermore, accessing an independent data mirror 410 can allow for real-time back-up of databases without disturbing a real-time application, such as a manufacturing process. The principles taught by the present invention can be utilized in other types of database platform.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

APPENDIX A

```ksh
#!/usr/bin/ksh

# vxlinkmirror.ksh - sets up the disk group for work

#  Danny Gross, August 26, 1999

# --- Concept is to store the name of an source's mirror in the comment
# field of the private area.  This way, no state data kept in OS.  If
#disks moved,
# the volume group isn't forgotten.

if [ $# -lt 1 ];then
        echo ""
        echo "usage: vxlinkmirror.ksh <disk group>"
        echo ""
        exit 0
fi commentedit()
{

# $1 is the disk group
# $2 is the disk
# $3 is the source for the disk
vxedit -g $1 set comment=$3 $2

}

# Disk pairings (source.mirror)
for line in `cat /root/root/work/ora.links.$(1)`
do
dg=`echo $line | awk -F, '{print $2}'`
source=`echo $line | awk -F, '{print $4}' | awk -Fs '{print $1}'`
mirror=`echo $line | awk -F, '{print $7}' | awk -Fs '{print $1}'`

# First, write the comments to the Production Disk Group

commentedit $dg ${source} ${mirror} done
```

APPENDIX B

```ksh
#!/usr/bin/ksh

# vxmirrordesc.ksh -- Builds the mirror Veritas description file

# Danny Gross, August 26, 1999

################################################
################################################

if ( $# -lt 1 );then
      echo ""
      echo "usage: vxmirrordesc.ksh <disk>"
      echo ""
      exit 0
fi

##The following is undocumented from Veritas or Sun.  Scary.  I like
it.

/usr/lib/vxvm/diag.d/vxprivutil -c dumpconfig /dev/rdsk/$1 >
/tmp/dmpdata.tmp

# Extract necessary data from the dump.

awk -f convl.awk /tmp/dmpdata.tmp > /tmp/descraw.tmp build the sd listing first for name in `grep ^sd /tmp/descraw.tmp | awk '{print
$2","$3","$4","$7}'`
do
      sd=`echo $name | awk -F, '{print $1}'`
      offset=`echo $name | awk -F, '{print $2}'`
      len=`echo $name | awk -F, '{print $3}'`
      diskrid=`echo $name | awk -F, '{print $4}' | awk -F= '{print
$2}'`
      mirrordisk=`grep ${diskrid} /tmp/descraw.tmp | awk '/^dm/{print
substr($3,10,13)}'`
      disk=`grep ${diskrid} /tmp/descraw.tmp | awk '/^dm/{print $2}'`

Remember, we want to change the source sd to the bcv sd.  This is
the
config copies killer.  Not anymore.

mirrorsd=`echo $sd | sed "s/${disk}/${mirrordisk}/g"`
      echo "sd ${mirrorsd} disk=${mirrordisk} ${offset} ${len}"
      echo "${sd},${disk},${mirrorsd},${mirrordisk}" >>
/tmp/convert.tmp
      #echo "OLD LINE is sd $sd disk=${disk} ${offset} ${len}"
done build the plex listing second
```

```
Plex information ties back to the sd.  Remember to convert the STD
to BCV.

for name in `grep ^plex /tmp/descraw.tmp | awk '{print $2","$3}'`
do
      plex=`echo $name | awk -F, '{print $1}'`
      plexrid=`echo $name | awk -F, '{print $2}' | awk -F\= '{print $2}'`
      sd=`grep ${plexrid} /tmp/descraw.tmp | awk '/^sd/{print $2}'`
      mirrorsd=`grep ${sd} /tmp/convert.tmp | awk -F, '{print $3}'`
      echo "plex ${plex} sd=${mirrorsd}"
done build the vol listing last

Nothing special here.  Keep the same vol names, just to prevent
confusion.

for name in `grep ^vol /tmp/descraw.tmp | awk '{print
$2","$3","$4","substr($5,5,7)}'`
do
      vol=`echo $name | awk -F, '{print $1}'`
      use_type=`echo $name | awk -F, '{print $2}'`
      read_pol=`echo $name | awk -F, '{print $3}'`
      volrid=`echo $name | awk -F, '{print $4}'`
      plex=`grep ${volrid} /tmp/descraw.tmp | awk '/^plex/{print $2}'`
      echo "vol ${vol} ${use_type} plex=${plex} ${read_pol}"
done end main.

#########################
###############################

# Cleanup trash files.
rm /tmp/dmpdata.tmp
rm /tmp/descraw.tmp
rm /tmp/convert.tmp
```

APPENDIX C

```awk
# convl.awk -- converts vxprivutil configdump (-c) into a vxmake-usable
#              desc file.

Danny Gross {
if ($1 == "dm")
{
    z=$0;getline      #get dm name and return
    y=$0;getline      #get comment
    getline           #skip putil0
    getline           #skip putil1
    getline   #skip putil2
    x=$0;getline      #get diskid
    getline           #skil last_da_name
    v=$0;getline      #get rid
    print z,y,x,v
} if ($1 == "sd")
{
    z=$0;getline      #Print sd name, and return
    getline           #skip comment
    getline           #skip putil0
    getline           #skip putil1
    getline           #skip putil2
    y=$0;getline      #Print dm_offset, and return
    getline           #skip pl_offset
    x=$0;getline      #Print len, and return
    getline           #skip update_tid
    v=$0;getline      #Print rid
    u=$0;getline      #Print plex_rid
    t=$0;getline      #Print dm_rid
    getline           #skip minor
    getline           #skip detach
    getline           #skip column
    getline           #skip mkdevice
    getline           #skip subvolume
    getline           #skip stale
    getline           #skip kdetach
    getline           #skip relocate
    print z,y,x,v,u,t
} if ($1 == "plex")
{
    x=$0;getline      #get plex and return
    getline           #skip comment
    getline           #skip putil0
    getline           #skip putil1
    getline           #skip putil2
    getline           #skip layout
```

```
        getline              #skip sd_num
        getline              #skip state
        getline              #skip update_tid
        y=$0;getline         #Get rid and return
        x=$0;getline         #Get vol_rid and return
        getline              #skip detach_tid
        getline              #skip noerror
        getline              #skip kdetach
        getline              #skip stale
        getline              #skip ncolumn
        print z,y,x
} if ($1 == "vol")
{
        z=$0;getline         #Get vol and return
        y=$0;getline         #Get use_type and return
        getline
        getline              #skip fstyp
        getline              #skip putil0
        getline              #skip putil1
        getline              #skip putil2
        getline              #skip state
        getline              #skip writeback
        getline              #skip writecopy
        getline              #skip specify_writecopy
        getline              #get pl_num
        getline              #skip start_opts
        x=$0;getline         #get read_pol
        getline              #skip minor
        getline              #skip user
        getline              #skip group
        getline              #skip mode
        getline              #skip log_type
        getline              #skip len
        getline              #skip log_len
        getline              #skip update_tid
        w=$0;getline         #get rid
        print z,y,x,w
}
}
```

What is claimed:

1. A method, comprising:

identifing a portion of a storage media to be mirrored, said storage media being capable of storing data from a manufacturing tool; and performing an independent disk-mirror split-off process on said identified portion of the storage media to be mirrored to produce a data mirror that is capable of being independently accessed, said independent disk-mirror split-off process comprising:

storing said identified portion of said storage media as a data mirror; and configuring said data mirror into a separate group to allow independent access of data in said data mirror, configuring said data mirror comprising causing said data mirror to become inactive and re-initializing said inactive data mirror into said separate group.

2. The method described in claim 1, wherein identifying a portion of a storage media to be mirrored further comprises identifying a portion of a disk group to be mirrored.

3. The method described in claim 1, wherein performing an independent disk-mirror split-off process further comprises:

storing at least one state information of said portion of said storage media to be mirrored;

establishing a plurality of data mirrors for said identified portion of the storage media using said state information;

performing a data mirror splitting process on one of said plurality of data mirrors to create an inactive data mirror;

re-initializing said inactive data mirror in response to said data mirror splitting process; and placing said re-initialized data mirror into a separate disk group to allow for independent access of said data mirror.

4. The method described in claim 3, wherein storing at least one state information of a disk to be mirrored further comprises storing said state information such that no state information is stored into an operating system of a computer system to achieve portability of said state information.

5. The method described in claim 3, wherein storing at least one state information of a disk to be mirrored further comprises storing the name of said portion of the storage media to be mirrored into the comment field of a configuration copy of a source disk.

6. The method described in claim 3, wherein establishing a data mirror further comprises using Time Finder®.

7. The method described in claim 3, wherein placing said re-initialized data mirror into a separate disk group further comprises using a Veritas® command, vxmake -g <new disk group> -d <group name>.desc.

8. The method described in claim 3, wherein performing a data mirror splitting process further comprises:

removing said re-initialized data mirror from said portion of storage media;

retrieving a configuration copy from at least one of said data mirrors that are not inactive;

extracting data fields from said configuration copy; and replacing a name of said re-initialized data mirror into said extracted data fields.

9. The method described in claim 1, wherein retrieving a configuration copy further comprises using a Veritas® command, vxprivutil, to retrieve said configuration copy.

10. An apparatus, comprising:

a computer system;

at least one manufacturing tool coupled with said computer system, wherein said manufacturing tool is controlled by said computer system;

a storage media coupled with said manufacturing tool, said storage media being capable of storing data from said manufacturing tool and generating a plurality of data mirrors of the stored data; and a volume manager coupled with said storage media and said computer system, said volume manager being capable of controlling said storage media and independently accessing at least one data mirror within said storage media.

11. The apparatus of claim 10, wherein said storage media comprises an array of data storage disks.

12. The apparatus of claim 10, wherein said storage media comprises at least one CD-ROM.

13. The apparatus of claim 10, wherein said volume manager is a Veritas Volume Manager®.

14. The apparatus of claim 10, wherein said storage media comprises a plurality of disk groups.

15. The apparatus of claim 14, wherein said disk groups comprise a plurality of data mirrors.

16. The apparatus of claim 10, wherein said data mirror is a database.

17. An apparatus comprising:

means for identifying a portion of a storage media to be mirrored, said storage media being capable of storing data from a manufacturing tool; and means for performing an independent disk-mirror split-off process on said identified portion of the storage media to be mirrored to produce a data mirror that is capable of being independently accessed, said means for performing said independent disk-mirror split-off process comprising:

means for storing said identified portion of said storage media as a data mirror; and means for configuring said data mirror into a separate group to allow independent access of data in said data mirror, said means for configuring said data mirror comprising means for causing said data mirror to become inactive and means for re-initializing said inactive data mirror into said separate group.

18. A computer readable program storage device encoded with instructions that, when executed by a computer, performs a method, comprising:

identifying a portion of a storage media to be mirrored, said storage media being capable of storing data from a manufacturing tool; and performing an independent disk-mirror split-off process on said identified portion of the storage media to be mirrored to produce a data mirror that is capable of being independently accessed, said independent disk-mirror split-off process comprising:

storing said identified portion of said storage media as a data mirror; and configuring said data mirror into a separate group to allow independent access of data in said datd mirror, configuring said data mirror comprising causing said data mirror to become inactive and re-initializing said inactive data mirror into said separate group.

19. The computer readable program storage device encoded with instructions that, when executed by a computer, performs the method described in claim 18, wherein identifying a portion of a storage media to be mirrored further comprises identifying a portion of a disk group to be mirrored.

20. The computer readable program storage device encoded with instructions that, when executed by a computer, performs the method described in claim 18, wherein performing an independent disk-mirror split-off process further comprises:

storing at least one state information of said portion of said storage media to be mirrored;

establishing a plurality of data mirrors for said identified portion of the storage media using said state information;

performing a data mirror splitting process on one of said plurality of data mirrors to create an inactive data mirror;

re-initializing said inactive data mirror in response to said data mirror splitting process; and placing said re-initialized data mirror into a separate disk group to allow for independent access of said data mirror.

21. The computer readable program storage device encoded with instructions that, when executed by a computer, performs the method described in claim 20, wherein storing at least one state information of a disk to be mirrored further comprises storing said state information such that no state information is stored into an operating system of a computer system to achieve portability of said state information.

22. The computer readable program storage device encoded with instructions that, when executed by a computer, performs the method described in claim 20, wherein storing at least one state information of a disk to be mirrored further comprises storing the name of said portion of the storage media to be mirrored into the comment field of a configuration copy of a source disk.

23. The computer readable program storage device encoded with instructions that, when executed by a computer, performs the method described in claim 20, wherein establishing a data mirror further comprises using Time Finder®.

24. The computer readable program storage device encoded with instructions that, when executed by a computer, performs the method described in claim 20, wherein placing said re-initialized data mirror into a separate disk group further comprises using a Veritas® command, vxmake -g <new disk group> -d <group name>.desc.

25. The computer readable program storage device encoded with instructions that, when executed by a computer, performs the method described in claim 20, wherein performing a data mirror splitting process further comprises:

removing said re-initialized data mirror from said portion of storage media;

retrieving a configuration copy from at least one of said data mirrors that are not inactive;

extracting data fields from said configuration copy; and replacing a name of said re-initialized data mirror into said extracted data fields.

26. The computer readable program storage device encoded with instructions that, when executed by a computer, performs the method described in claim 18, wherein retrieving a configuration copy further comprises using a Veritas® command, vxprivutil, to retrieve said configuration copy.

27. An apparatus, comprising:

a storage media for storing data, said storage media being capable of storing data from a manufacturing tool; and a controller operatively coupled to said storage media, said controller to identify a portion of said storage media for storage as a data mirror and to configure said data mirror into a separate group by inactivating and re-initializing said data mirror to allow independent access of data in said data mirror.

28. The apparatus of claim 27, further comprising a volume manager operatively coupled with said storage media and said controller, said volume manager to independently access said data mirror.

29. The apparatus of claim 27, wherein said storage media comprising a plurality of disk groups.

30. The apparatus of claim 29, wherein said disk groups comprise a plurality of data mirrors.

* * * * *

UNITED STATES PATENT AND TRADEMARK OFFICE
CERTIFICATE OF CORRECTION

PATENT NO. : 6,553,390 B1
DATED : April 22, 2003
INVENTOR(S) : Danny B. Gross, Brian L. Borgeson and Michael D. O'Donnell It is certified that error appears in the above-identified patent and that said Letters Patent is hereby corrected as shown below:

Column 17,
Line 4, replace "identifing" with -- identifying --.

Column 18,
Line 60, replace "datd" with -- data --.

Signed and Sealed this

Fifth Day of August, 2003

JAMES E. ROGAN
*Director of the United States Patent and Trademark Office*